(12) United States Patent
Davis et al.

(10) Patent No.: US 11,201,891 B2
(45) Date of Patent: Dec. 14, 2021

(54) PRIORITIZATION OF REMEDIATION ACTIONS FOR ADDRESSING VULNERABILITIES IN AN ENTERPRISE SYSTEM

(71) Applicant: EMC IP Holding Company LLC, Hopkinton, MA (US)

(72) Inventors: Sashka T. Davis, Vienna, VA (US); Gregory A. Gerber, Jr., Westerville, OH (US)

(73) Assignee: EMC IP Holding Company LLC, Hopkinton, MA (US)

( * ) Notice: Subject to any disclaimer, the term of this patent is extended or adjusted under 35 U.S.C. 154(b) by 239 days.

(21) Appl. No.: 16/399,199

(22) Filed: Apr. 30, 2019

(65) Prior Publication Data

US 2020/0351294 A1 Nov. 5, 2020

(51) Int. Cl.
*H04L 29/06* (2006.01)
*H04L 12/24* (2006.01)
(Continued)

(52) U.S. Cl.
CPC ............ *H04L 63/1433* (2013.01); *G06F 8/65* (2013.01); *G06F 21/55* (2013.01); *G06F 21/554* (2013.01); *H04L 63/0263* (2013.01); *H04L 63/20* (2013.01)

(58) Field of Classification Search
CPC . H04L 63/1433; H04L 63/20; H04L 63/0263; H04L 47/20; H04L 41/046; H04L 41/0893; G06F 21/57; G06F 21/577; G06F 8/65; G06F 2221/034; G06F 21/55; G06F 21/554
See application file for complete search history.

(56) References Cited

U.S. PATENT DOCUMENTS 8,495,745 B1   7/2013  Schrecker et al.
8,595,845 B2 * 11/2013  Basavapatna ....... H04L 63/1433
                                                    726/25
(Continued)

OTHER PUBLICATIONS

Santosh S. Vempala, "The Random Projection Method," Center for Discrete Mathematics and Theoretical Computer Science (DIMACS), Oct. 13, 2006, 48 pages.
(Continued)

*Primary Examiner* — Michael Simitoski
(74) *Attorney, Agent, or Firm* — Ryan, Mason & Lewis, LLP (57) ABSTRACT

A method includes identifying two or more vulnerabilities, each vulnerability affecting a set of one or more assets of an enterprise system. The method also includes assigning a weight to each vulnerability, the weight assigned to each of the vulnerabilities being based at least in part on the set of assets affected by that vulnerability, asset criticalities associated with the set of assets affected by that vulnerability, and at least one of (i) an exploitability potential of that vulnerability and (ii) an impact potential of that vulnerability. The method further includes determining an order in which to apply remediation actions in the enterprise system to address at least one of the vulnerabilities based at least in part on the weights assigned to the vulnerabilities, and applying, in accordance with the determined order, at least one of the remediation actions to at least one of the assets in the enterprise system.

20 Claims, 6 Drawing Sheets

(51) Int. Cl.
   *G06F 8/65* (2018.01)
   *G06F 21/55* (2013.01)
   *H04L 12/813* (2013.01)

(56) References Cited

U.S. PATENT DOCUMENTS

| | | | |
|---|---|---|---|
| 9,213,995 B1* | 12/2015 | Rao | G06Q 50/01 |
| 2008/0307525 A1 | 12/2008 | Nickle | |
| 2010/0153156 A1 | 6/2010 | Guinta et al. | |
| 2012/0304300 A1* | 11/2012 | LaBumbard | G06F 21/577 726/25 |
| 2013/0174259 A1* | 7/2013 | Pearcy | H04L 41/06 726/25 |
| 2015/0237065 A1* | 8/2015 | Roytman | H04L 63/1433 726/25 |
| 2015/0310215 A1 | 10/2015 | McBride et al. | |
| 2016/0119373 A1* | 4/2016 | Fausto | H04L 63/1433 726/25 |
| 2016/0248794 A1* | 8/2016 | Cam | H04L 63/1433 |
| 2019/0044972 A1* | 2/2019 | Ikeda | H04L 63/1458 |
| 2019/0238584 A1* | 8/2019 | Somasundaram | H04L 63/1433 |
| 2019/0297113 A1* | 9/2019 | Yang | H04L 47/20 |
| 2020/0092319 A1* | 3/2020 | Spisak | G06N 7/005 |
| 2020/0162497 A1* | 5/2020 | Iyer | H04L 63/1433 |
| 2020/0210590 A1* | 7/2020 | Doyle | G06F 8/77 |

OTHER PUBLICATIONS

V.D. Blondel et al., "Fast Unfolding of Communities in Large Networks," Journal of Statistical Mechanics: Theory and Experiment, Oct. 9, 2008, 12 pages, vol. 2008, No. 10.

T.G. Kolda et al., "Tensor Decompositions and Applications," Society for Industrial and Applied Mathematics (SIAM) Review, Aug. 2009, pp. 455-500, vol. 51, No. 3.

Béla Bollobás, "Modern Graph Theory," Graduate Texts in Mathematics, 1998, 4 pages, vol. 184.

Olle Häggström, "Finite Markov Chains and Algorithmic Applications," London Mathematical Society Student Texts, 2001, 125 pages.

Wade Shen, "Active Social Engineering Defense (ASED)," DARPA Information Innovation Office (DOD-DARPA-I2O), Nov. 9, 2017, 15 pages.

J. Leskovec et al., "Mining of Massive Datasets," Cambridge University Press, 2011, 513 pages.

First Improving Security Together, "Common Vulnerability Scoring System SIG," https://www.first.org/cvss/, downloaded Apr. 30, 2019, 2 pages.

U.S. Appl. No. 16/229,075 filed in the name of Sashka T. Davis et al. filed Dec. 21, 2018 and entitled "Automated Determination of Relative Asset Importance in an Enterprise System."

* cited by examiner

PRIORITIZATION OF REMEDIATION ACTIONS FOR ADDRESSING VULNERABILITIES IN AN ENTERPRISE SYSTEM

FIELD

The field relates generally to information security, and more particularly to detection of security threats in enterprise systems.

BACKGROUND

Various entities are subject to different types of security threats. Some security threats relate to networking and computer security for an enterprise system. Security threats include, for example, vulnerabilities in assets of the enterprise system, which present risks that can expose the enterprise and its users or devices. As the number of assets in an enterprise system grows, the number of vulnerabilities may increase. The task of monitoring and remediating such vulnerabilities and other security threats thus presents various challenges.

SUMMARY

Illustrative embodiments of the present invention provide techniques for prioritizing remediation actions for addressing vulnerabilities in an enterprise system. Embodiments advantageously improve the security of enterprise systems through the prioritization of the order in which vulnerabilities are remediated, including prioritizing remediation of different assets affected by the vulnerabilities and prioritizing remediation of assets in different network segments of the enterprise system.

In one embodiment, a method comprises identifying two or more vulnerabilities, each of the vulnerabilities affecting a set of one or more assets of an enterprise system. The method also comprises assigning a weight to each of the vulnerabilities, the weight assigned to each of the vulnerabilities being based at least in part on the set of one or more assets affected by that vulnerability, asset criticalities associated with the set of assets affected by that vulnerability, and at least one of (i) an exploitability potential of that vulnerability and (ii) an impact potential of that vulnerability. The method further comprises determining an order in which to apply a set of remediation actions in the enterprise system to address at least one of the vulnerabilities based at least in part on the weights assigned to the vulnerabilities, and applying, in accordance with the determined order, at least one of the set of remediation actions to at least one of the assets in the enterprise system. The method is performed by at least one processing device comprising a processor coupled to a memory.

The processing device may be implemented, for example, in one or more network devices in a computer network, in a security operations center of an enterprise, or in a security analytics system or other type of network security system associated with the computer network or an enterprise.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

As the number of assets in an enterprise system grows, it is increasingly difficult to monitor and remediate vulnerabilities in such assets. In some cases, it is desired to prioritize among detected vulnerabilities and among assets in an enterprise system. There is an additional need for techniques in vulnerability patch management and other vulnerability mitigation, given a multitude of factors and data sources. Illustrative embodiments provide techniques for determining (i) at least a partial order in which patches for different vulnerabilities should be applied, (ii) at least a partial order in which assets should be patched, and (iii) at least a partial order in which networks or sub-networks within an enterprise system should be patched. Illustrative embodiments further provide techniques for selecting a set of assets as candidates for remediation (e.g., through using increased authentication mechanisms such as two-factor authentication, protection behind firewalls, etc.) when patches for vulnerabilities affecting such assets are not available.

Figure 1:
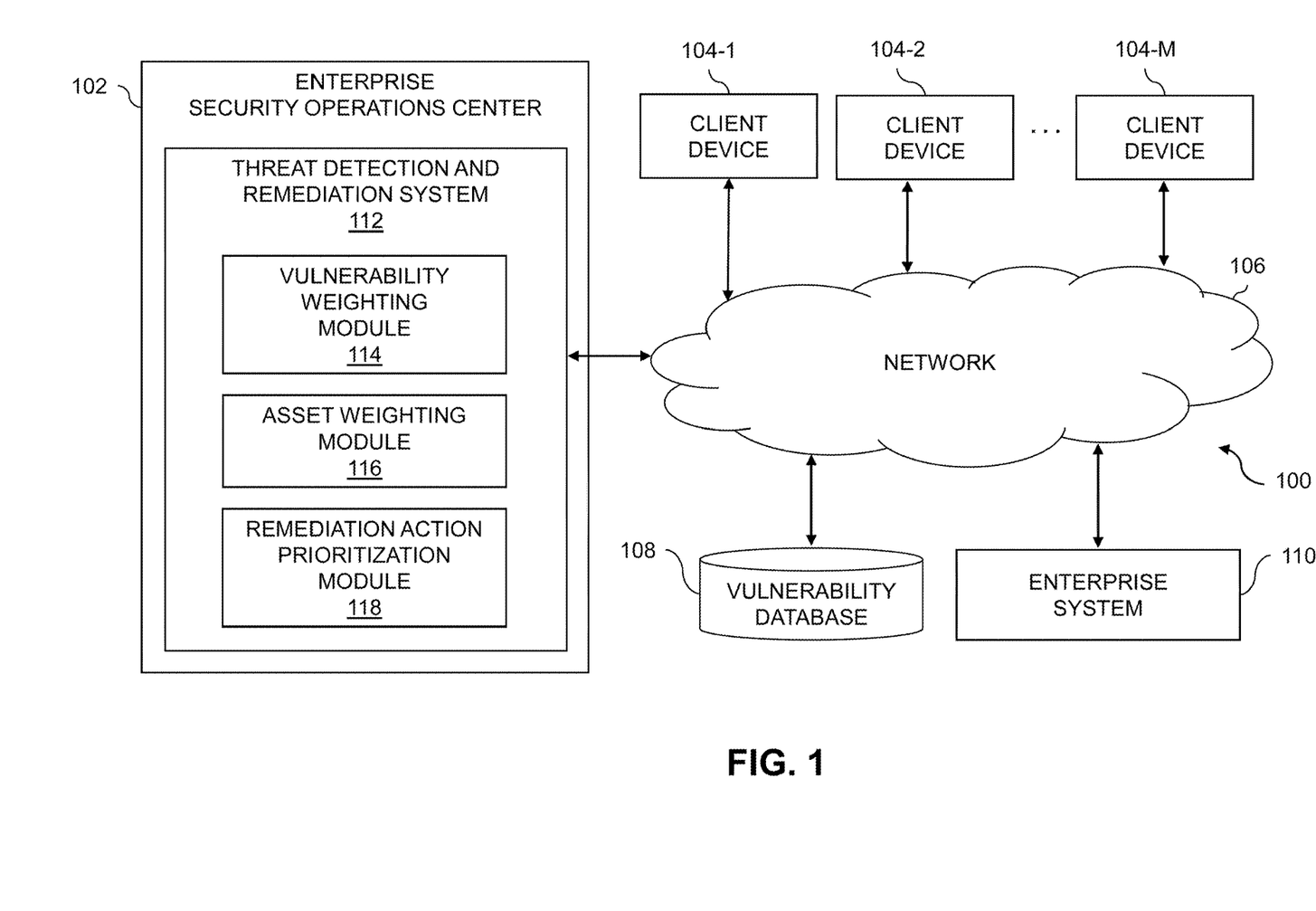
FIG. 1 is a block diagram of an information processing system for prioritizing remediation actions for addressing vulnerabilities in an enterprise system in an illustrative embodiment of the invention.

FIG. 1 shows an information processing system 100 configured in accordance with an illustrative embodiment. The information processing system 100 is assumed to be built on at least one processing platform and provides functionality for prioritizing remediation actions for addressing vulnerabilities in an enterprise system 110. The assets may include, by way of example, physical and virtual computing resources in the enterprise system 110. Physical computing resources may include physical hardware such as servers, storage systems, networking equipment, Internet of Things (IoT) devices, other types of processing and computing devices, etc. Virtual computing resources may include virtual machines (VMs), containers, etc.

In this embodiment, the system 100 more particularly comprises an enterprise security operations center (SOC) 102 and a plurality of client devices 104-1, 104-2, ... 104-M, collectively referred to herein as client devices 104. The client devices 104 are coupled to a network 106. Also coupled to the network 106 is a vulnerability database 108, which may store various information relating to vulnerabilities as will be described in further detail below.

The client devices 104 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 104 may also or alternately comprise virtualized computing resources, such as VMs, containers, etc.

The client devices 104 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing nodes are possible, as will be appreciated by those skilled in the art.

The network 106 is assumed to comprise a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks.

The vulnerability database 108, as discussed above, is configured to store and record information relating to vulnerabilities and assets affected by vulnerabilities in the enterprise system 110. Such information may include Vulnerability and Risk Management (VRM) assessment data for assets and vulnerabilities in the enterprise system 110.

The vulnerability database 108 in some embodiments is implemented using one or more storage systems or devices associated with the enterprise SOC 102. In some embodiments, one or more of the storage systems utilized to implement the vulnerability database 108 comprises a scale-out all-flash content addressable storage array such as an XtremIO™ storage array from Dell EMC of Hopkinton, Mass. Other types of storage arrays, including by way of example VNX® and Symmetrix VMAX® storage arrays also from Dell EMC, can be used to implement a storage system in other embodiments.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays such as Unity™, software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the enterprise SOC 102, as well as to support communication between the enterprise SOC 102 and other related systems and devices not explicitly shown.

The client devices 104 are configured to access or otherwise utilize an enterprise system 110. The enterprise system 110 may represent an information technology (IT) infrastructure comprising a plurality of assets (e.g., physical or virtual computing resources) of a business, entity or other enterprise.

In the present embodiment, alerts or notifications generated by a threat detection and remediation system 112 of the enterprise SOC 102 are provided over network 106 to client devices 104, or to a system administrator, IT manager, or other authorized personnel via one or more security or host agents. Such security or host agents may be implemented via the client devices 104 or by other computing or processing devices associated with a system administrator, IT manager or other authorized personnel. Such devices can illustratively comprise mobile telephones, laptop computers, tablet computers, desktop computers, or other types of computers or processing devices configured for communication over network 106 with the enterprise SOC 102 and the threat detection and remediation system 112. For example, a given security or host agent may comprise a mobile telephone equipped with a mobile application configured to receive alerts from the enterprise SOC 102 or the threat detection and remediation system 112 and to provide an interface for the security agent to select particular remediation measures for responding to the alert or notification. Examples of such remediation measures may include blocking access by one or more of the client devices 104 to assets of the enterprise system 110, requiring user input or authentication by the client devices 104 to obtain information from or otherwise utilize one or more assets of the enterprise system 110, triggering further review of the enterprise system 110 or assets thereof, etc. Remediation measures may also include applying security hardening procedures to assets of the enterprise system 110, establishing new or modified monitoring of assets of the enterprise system 110, changing or adjusting the configuration of assets of the enterprise system 110, etc.

It should be noted that a "security agent" or "host agent" as these terms are generally used herein may comprise an automated entity, such as a software entity running on a processing device. Accordingly, a security agent or host agent need not be a human entity.

As shown in FIG. 1, the enterprise SOC 102 comprises threat detection and remediation system 112. As will be described in further detail below, the threat detection and remediation system 112 is configured to prioritize remediation actions for addressing vulnerabilities in the enterprise system 110.

Although shown as an element of the enterprise SOC 102 in this embodiment, the threat detection and remediation system 112 in other embodiments can be implemented at least in part externally to the enterprise SOC 102, for example, as a stand-alone server, set of servers or other type of system coupled to the network 106. In some embodiments, the threat detection and remediation system 112 may be implemented at least in part within one or more of the client devices 104.

The threat detection and remediation system 112 in the FIG. 1 embodiment is assumed to be implemented using at least one processing device. Each such processing device generally comprises at least one processor and an associated memory, and implements one or more functional modules for controlling certain features of the threat detection and remediation system 112. In the FIG. 1 embodiment, the threat detection and remediation system 112 comprises a vulnerability weighting module 114, an asset weighting module 116, and a remediation action prioritization module 118.

The threat detection and remediation system 112 is configured to identify vulnerabilities affecting assets of the enterprise system 110. This may include monitoring the enterprise system 110, obtaining information from the vulnerability database 108, etc. The vulnerability weighting module 114 is configured to assign weights to each of the vulnerabilities. The weight assigned to each of the vulnerabilities may be based at least in part on the set of one or more assets affected by that vulnerability, asset criticalities associated with the set of assets affected by that vulnerability, an exploitability potential of that vulnerability, and an impact potential of that vulnerability. The vulnerability weighting module 114 may assign the weights to the vulnerabilities utilizing a vulnerability weight function that increases a given weight assigned to a given vulnerability: as a number of assets affected by the given vulnerability increases; as criticalities of the assets affected by the given vulnerability increases; as the exploitability potential of the given vulnerability increases; and as the impact potential of the given vulnerability increases.

The asset weighting module 116 is configured to assign weights to each of at least a subset of the assets of the enterprise system 110 based at least in part on static criticality metrics and dynamic criticality metrics associated with the assets. The asset weighting module 116 may assign the weights to the assets utilizing an asset weight function that increases a given weight assigned to a given asset: as a criticality of the given asset increases; as a number of vulnerabilities affecting the given asset increases; as the exploitability potential of the vulnerabilities affecting the given asset increases; and as the impact potential of the vulnerabilities affecting the given asset increases.

The remediation action prioritization module 118 is configured to determine an order in which to apply a set of remediation actions in the enterprise system 110 to address at least one of the vulnerabilities based at least in part on the weights assigned to the vulnerabilities and the assets. The threat detection and remediation system 112 is configured to apply at least one of the set of remediation actions to at least one of the assets in the enterprise system, in accordance with the order determined by the remediation action prioritization module 118. The remediation action prioritization module 118 may determine a partial order for addressing the vulnerabilities, a partial order for applying remediation actions to the assets, a partial order for applying remediation actions to network segments of the enterprise system 110, etc. The remediation action prioritization module 118 may further determine or select a set of assets to apply remediation actions to when patches are not available for one or more vulnerabilities.

It is to be appreciated that the particular arrangement of the enterprise SOC 102, the threat detection and remediation system 112, the vulnerability weighting module 114, the asset weighting module 116, and the remediation action prioritization module 118 illustrated in the FIG. 1 embodiment is presented by way of example only, and alternative arrangements can be used in other embodiments. As discussed above, for example, the enterprise SOC 102, the threat detection and remediation system 112, the vulnerability weighting module 114, the asset weighting module 116, and the remediation action prioritization module 118 may in some embodiments be implemented internal to one or more of the client devices 104. As another example, the functionality associated with the vulnerability weighting module 114, the asset weighting module 116, and the remediation action prioritization module 118 may be combined into one module, or separated across more than three modules with the multiple modules possibly being implemented with multiple distinct processors or processing devices.

At least portions of the vulnerability weighting module 114, the asset weighting module 116, and the remediation action prioritization module 118 may be implemented at least in part in the form of software that is stored in memory and executed by a processor.

It is to be understood that the particular set of elements shown in FIG. 1 for prioritizing remediation actions for addressing vulnerabilities in the enterprise system 110 is presented by way of illustrative example only, and in other embodiments additional or alternative elements may be used. Thus, another embodiment may include additional or alternative systems, devices and other network entities, as well as different arrangements of modules and other components.

By way of example, in other embodiments, the threat detection and remediation system 112 may be implemented external to enterprise SOC 102, such that the enterprise SOC 102 can be eliminated.

In some embodiments, the threat detection and remediation system 112 may be part of or otherwise associated with a system other than the enterprise SOC 102, such as, for example, a critical incident response center (CIRC), a security analytics system, a security information and event management (SIEM) system such as the RSA NetWitness® Platform Evolved SIEM, from Dell EMC, a Governance, Risk and Compliance (GRC) system, etc.

The threat detection and remediation system 112 and other portions of the system 100, as will be described in further detail below, may be part of cloud infrastructure such as an Amazon Web Services (AWS) system. Other examples of cloud-based systems that can be used to provide the threat detection and remediation system 112 include Virtustream Enterprise Cloud, Virtustream Storage Cloud, Google Cloud Platform (GCP) and Microsoft Azure.

The threat detection and remediation system 112 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The client devices 104 and threat detection and remediation system 112 or components thereof (e.g., the vulnerability weighting module 114, the asset weighting module 116, and the remediation action prioritization module 118) may be implemented on respective distinct processing platforms, although numerous other arrangements are possible. For example, in some embodiments at least portions of the threat detection and remediation system 112 and one or more of the client devices 104 are implemented on the same processing platform. A given client device (e.g., 104-1) can therefore be implemented at least in part within at least one processing platform that implements at least a portion of the threat detection and remediation system 112.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the client devices 104, threat detection and remediation system 112 or portions or components thereof, to reside in different data centers. Numerous other distributed implementations are possible. The threat detection and remediation system 112 can also be implemented in a distributed manner across multiple data centers.

Additional examples of processing platforms utilized to implement threat detection and remediation system 112 in illustrative embodiments will be described in more detail below in conjunction with FIGS. 5 and 6.

It is to be appreciated that these and other features of illustrative embodiments are presented by way of example only, and should not be construed as limiting in any way.

An exemplary process for prioritizing remediation actions for addressing vulnerabilities in an enterprise system will now be described in more detail with reference to the flow diagram of FIG. 2. It is to be understood that this particular process is only an example, and that additional or alternative processes for prioritizing remediation actions for addressing vulnerabilities in an enterprise system can be carried out in other embodiments.

In this embodiment, the process includes steps 200 through 208. These steps are assumed to be performed by the threat detection and remediation system 112 utilizing the vulnerability weighting module 114, the asset weighting module 116, and the remediation action prioritization module 118. The process begins with step 200, identifying two or more vulnerabilities, each of the vulnerabilities affecting a set of one or more assets of an enterprise system. The enterprise system may comprise IT infrastructure of an enterprise, including but not limited to physical infrastructure such as a data center, combinations of physical and virtual infrastructure such as a software-defined data center, a cloud computing infrastructure, etc. The plurality of assets may comprise physical or virtual computing resources, such as servers, storage systems, virtual machines, containers, etc.

In step 202, weights are assigned to each of the vulnerabilities. The weight assigned to each of the vulnerabilities is based at least in part on the set of one or more assets affected by that vulnerability, asset criticalities associated with the set of assets affected by that vulnerability, an exploitability potential of that vulnerability, and an impact potential of that vulnerability. The exploitability potential of a given vulnerability may be based at least in part on an exploitability metric, an exploit code maturity metric, and a threat activity metric. The impact potential of a given vulnerability may be based at least in part on an impact metric, a severity metric, an attack complexity metric, and a privilege required metric. Step 202 may utilize a vulnerability weight function that increases the given weight assigned to the given vulnerability: as a number of assets affected by the given vulnerability increases; as criticalities of the assets affected by the given vulnerability increases; as the exploitability potential of the given vulnerability increases; and as the impact potential of the given vulnerability increases.

In step 204, weights are assigned to each of the assets of the enterprise system based at least in part on static criticality metrics and dynamic criticality metrics associated with the assets. In some embodiments, step 204 is optional. For example, the weights assigned to the assets may not be required for determining a partial order of which vulnerabilities to patch or to otherwise apply remediation actions to. The static criticality metric for a given asset may be based at least in part on a type of one or more applications hosted on the given asset and an importance of the one or more applications to the enterprise system. The dynamic criticality metric for a given asset may be based at least in part on usage of the given asset, a number of users that access the given asset, an amount of network traffic to and from the given asset, and a fraction of time that the given asset is in use in a designated time period. Step 204 may utilize an asset weight function that increases the given weight assigned to the given asset: as a criticality of the given asset increases; as a number of vulnerabilities affecting the given asset increases; as the exploitability potential of the vulnerabilities affecting the given asset increases; and as the impact potential of the vulnerabilities affecting the given asset increases.

Figure 2:
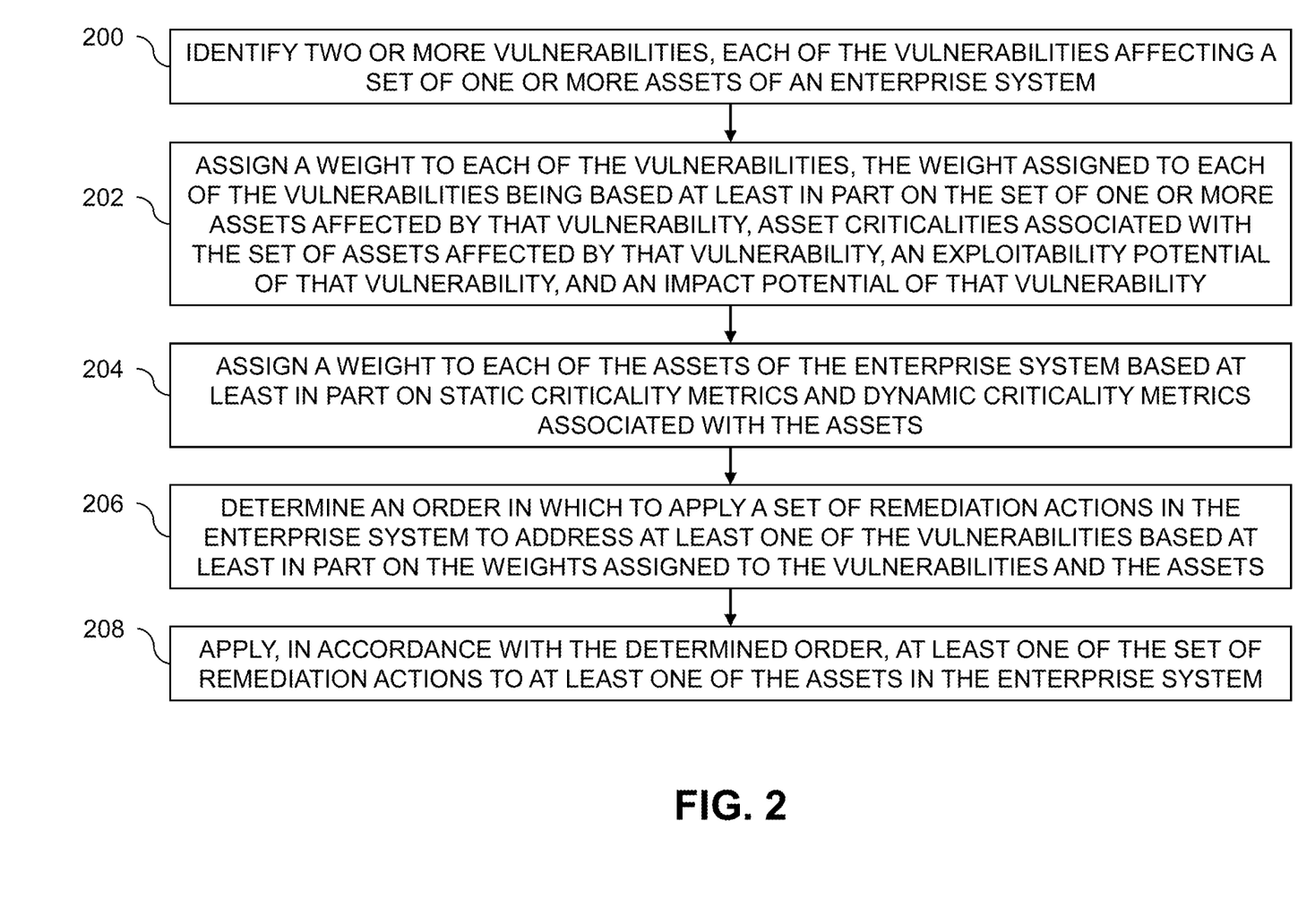
FIG. 2 is a flow diagram of an exemplary process for prioritizing remediation actions for addressing vulnerabilities in an enterprise system in an illustrative embodiment.

The FIG. 2 process continues with step 206, determining an order in which to apply a set of remediation actions in the enterprise system to address at least one of the vulnerabilities based at least in part on the weights assigned to the vulnerabilities and the assets. As noted above, in some embodiments determining the order in which to apply the set of remediation actions includes determining a partial order of which vulnerabilities to patch or to otherwise apply remediation actions to. In such cases, the weights assigned to the assets may not be necessary. In step 208, at least one of the set of remediation actions are applied to at least one of the assets in the enterprise system, in accordance with the order determined in step 206.

In some embodiments, step 206 includes determining an ordering of network segments of the enterprise system to apply the set of remediation actions to, based at least in part on weights assigned to each of the network segments of the enterprise system. A given weight assigned to a given one of the network segments of the enterprise system may be based at least in part on combined weights of a subset of the assets of the enterprise system that are in the given network segment.

Step 206 may further or alternatively include selecting a set of assets to apply one or more of the set of remediation actions for addressing one or more of the vulnerabilities that do not have available patches, based at least in part on the weights assigned to the assets of the enterprise system. A given one of the set of remediation actions for remediating a given vulnerability for which a patch is not available may comprise applying one or more security hardening measures to a given one of the assets affected by the given vulnerability. Such security hardening measures may include adding additional authentication mechanisms for accessing the given asset, placing the given asset behind a firewall in the enterprise system, etc. The set of remediation actions for remediating a given vulnerability for which a patch is available may comprise applying the patch to a given one of the assets.

Vulnerability prioritization, patch management, and vulnerability mitigation in enterprise systems are processes with overwhelming complexity due to the multitude of contributing factors. An enterprise system, for example, may have thousands of computers or other devices running a large variety of software applications. Such computers and software applications are examples of assets of the enterprise system. Software bugs may expose vulnerabilities in such assets that require patches and fixes to be applied, possibly to thousands of devices. Further, if a patch is not available for a particular vulnerability, alternative remediation strategies must be designed and implemented to mitigate that vulnerability.

The IT infrastructure and network topology of an enterprise system also adds complexity to vulnerability prioritization, patch management, and vulnerability mitigation processes. For example, various different security policies may be utilized for different network segments of an enterprise system. Some assets of an enterprise system may face a public IP space directly, while other assets may utilize addresses in a non-routable IP space resulting in segmented networks with different tiers and functionalities. In addition, it is likely that different networks and sub-networks of an enterprise system are managed by distinct IT personnel, possibly in different geographic locations. The risk of a compromised, lost or stolen asset, however, may often propagate through an enterprise system in a manner that IT personnel cannot predict. The cost of such compromise, loss or theft can be grave and widespread.

Some embodiments provide techniques for answering the following:

1. How to prioritize which fragment of a network or sub-network of an enterprise system to patch first?
2. How to prioritize the order in which assets of an enterprise system are patched (e.g., for the entire enterprise system, within one or more network segments thereof, etc.)?
3. How to prioritize the installation of patches?
4. How to decide on a remediation strategy when patches are not available?

One answer to the above questions may be to utilize a "patch all" strategy. Such patch all strategies, however, may not be a feasible solution for an enterprise system, which may be complex with hundreds or thousands of assets. Prioritization of vulnerabilities may be practiced by an enterprise system that maintains assets, even if such prioritization is in an ad-hoc or heuristic manner. In some cases, Common Vulnerability Scoring System (CVSS) scores may be used to prioritize vulnerabilities based on a complex formula that combines various factors. CVSS, for example, may utilize base, exploitability, impact, and temporal metrics to produce a CVSS score. The base metric may represent intrinsic characteristics of a vulnerability. The intrinsic characteristics are assumed to be constant, both over time and across user environments. The exploitability metric may represent the difficulty of exploiting a vulnerability (e.g., it represents characteristics of the asset that is vulnerable). The impact metric, also referred to as an environmental metric, characterizes the results of successfully exploiting a vulnerability. The temporal metric indicates characteristics of a vulnerability that may change over time, but not across different user environments. As an example, the availability of a patch for a vulnerability would decrease the temporal metric while the availability of an exploit toolkit would increase the temporal metric.

CVSS scores, while useful, have limited scope. CVSS scores, for example, do not take into account VRM assessment data because doing so adds specifics and complexity that is relative to an individual enterprise. CVSS scores also do not take into account asset criticality information, or the dynamics of network traffic and usage statistics for assets in an enterprise system. CVSS scores further fail to capture information about current threat activity related to vulnerabilities (e.g., on the Internet).

In some cases, an enterprise system may implement decision policies for patching assets thereof that prioritize based on CVSS scores to decide what vulnerabilities to patch, prioritize based on asset criticalities alone, or prioritize based on whether an asset is in a network segment with public facing IP. Such strategies are one-dimensional approaches, and are inadequate. For example, assume there is a high criticality asset with a vulnerability having a medium impact score, and there is another asset of low criticality but with a vulnerability having a high impact score. In this example, such strategies may not provide a suitable answer for which asset should be patched first. Further, as the number of assets and vulnerabilities increases, such strategies are further deficient. Assume, as another example, that an enterprise system has 500 assets of high criticality and 10,000 assets of medium criticality, with 5,000 vulnerabilities having various impacts spread across such assets. Further assume that information is available regarding the number of users that utilize various ones of such assets of different criticalities, which introduces additional risk. Such strategies are not adequate for managing such scenarios.

Illustrative embodiments provide a set of algorithms for determining partial ordering in which patch vulnerabilities should be applied, for determining partial ordering in which assets should be patched, for determining partial ordering in which networks and sub-networks should be patched, and for selecting a set of assets for additional remediation when patches for vulnerabilities are not available.

Some embodiments utilize or take into account vulnerability impact. Vulnerability impact metrics may be intrinsic to each vulnerability. The vulnerability impact metric for a given vulnerability may measure the severity of the given vulnerability as well as its effect on an enterprise system with an asset compromised by the given vulnerability. Vulnerability exploitation and exploit code maturity metrics may also be used. Such metrics may capture how easy or difficult it is to exploit a bug or vulnerability on an asset or system of interest. VRM assessment data may be further utilized, where the VRM assessment data enumerates, for each asset in an enterprise system, what vulnerabilities are present on that asset.

For each asset of an enterprise system, some embodiments may consider both static and dynamic asset criticality. Static asset criticality may be used to represent the type of application that an asset hosts, and the importance of that application to the enterprise system. For example, a database that stores personally identifiable information (PII), or confidential and proprietary information of the enterprise system, may have "high" static criticality. In some cases, the static criticality may be classified or measured as low, medium or high, or using another desired scale or scoring system (e.g., a numerical scale such as 1 to 10, 1 to 100, etc.). Dynamic asset criticality may be used to represent the usage of an asset, the number of users that access the asset, the amount of traffic that leaves or emanates from the asset, the fraction of time that the asset is used in some predefined time period, etc. The dynamic asset criticality, similar to the static asset criticality, may be classified or measured as low, medium, or high, or using another desired scale or scoring system. Some embodiments further consider the IP address and the network or network segment to which an asset belongs, the operating system that runs on an asset, or other types of information and parameters for breaking ties if and when needed.

As discussed above, illustrative embodiments provide techniques for determining (A) a partial order in which patches for different vulnerabilities should be applied, (B) a partial order in which assets should be patched, (C) a partial order in which the networks or sub-networks should be patched, and (D) a set of assets for which remediation is desired or necessary when patches are not available. The techniques for (A)-(D) are useful in a variety of contexts, including in products such as RSA Archer® and NetWitness®, available from Dell EMC.

Before turning to specific implementations of algorithms for (A)-(D), weight functions used for vulnerabilities and assets are discussed. The weight functions, one for vulnerabilities and the other for assets, are meant to represent and approximate the risk imposed by those entities in the enterprise system given a multitude of factors.

Figure 3:
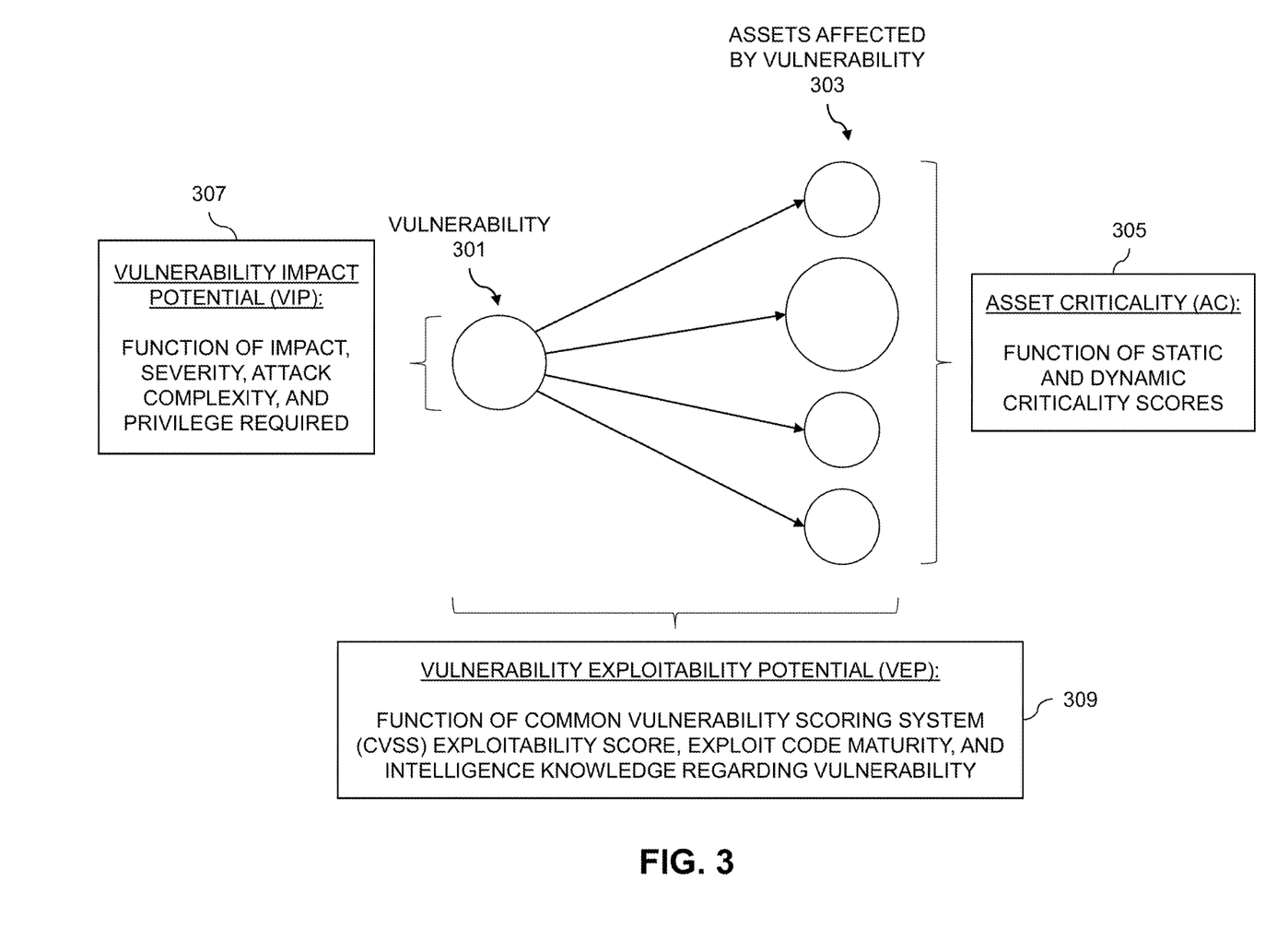
FIG. 3 illustrates relationships between vulnerability impact potential, vulnerability exploitability potential, and asset criticality for a vulnerability on multiple assets of an enterprise system in an illustrative embodiment.

For each vulnerability in a given enterprise system, its weight may depend on: the set of assets that it impacts (e.g., as determined from VRM assessment data); the criticalities of each of the assets it impacts; the exploitability potential of the vulnerability; and the potential impact of the vulnerability. The value that the vulnerability weighting function computes is a measure of the risk that is incurred if a given vulnerability is not patched. FIG. 3 illustrates relationships and factors that the vulnerability weighting function takes into account in some embodiments.

FIG. 3 shows a vulnerability 301 that affects various assets 303. The size of each of the assets 303 is proportional it its associated asset criticality (AC) 305, which may be a function of the static and dynamic criticality scores as discussed above. In some embodiments, an asset ranking score determined based on an amount of traffic or usage of an asset may be used as or in place of the dynamic criticality score. The vulnerability 301 has an associated vulnerability impact potential (VIP) 307, which may be a function of factors such as impact, severity, attack complexity, privilege required, etc. The VIP 307, in some embodiments, is approximated as a CVSS base score, CVSS exploitability score, or combinations thereof. The vulnerability 301 also has an associated vulnerability exploitability potential (VEP) 309, which may be a function of a CVSS exploitability score, exploit code maturity, and intelligence knowledge regarding the vulnerability 301 (e.g., knowledge of activities related to the vulnerability 301 at present in the wild).

The vulnerability weight function, in some embodiments, has an AC 305, VIP 307, and VEP 309 for each of the assets 303 affected by the vulnerability 301.

The AC 305, in some embodiments, is a function of two parameters—the static criticality score and the dynamic criticality score or asset ranking. The static criticality score may be obtained from a monitoring tool of the enterprise system. An example of such a monitoring tool includes RSA Archer® available from Dell EMC. The asset criticality score may be a numeric value (e.g., 1, 2, 3, 4 or 5) or other type of score or weighting (e.g., low, medium, or high, etc.). The dynamic criticality score or asset ranking may be a function of the amount of traffic that the asset receives, the number of connections the asset receives, the number of distinct IPs for a given period of time, etc. The dynamic criticality score may be a percentile rank, a number between 1 and 100 (possibly scaled to a desired range such as [1,5] through division by 20 and rounding to the nearest integer), etc. Examples of techniques for determining asset rankings or importance are disclosed in U.S. patent application Ser. No. 16/229,075, filed Dec. 21, 2018 and entitled "Automated Determination of Relative Asset Importance in an Enterprise System," which is incorporated by reference herein.

The criticality of an asset a, denoted AC(a), may be computed as a convex combination of its static and dynamic criticalities. Let the static and dynamic criticality of an asset a be S(a) and D(a), respectively. $AC(a)=\alpha \times S(a)+(1-\alpha) \times D(a)$, for $\alpha \in [0,1]$. The choice of $\alpha$ can be user-defined. In some embodiments, $\alpha=\frac{1}{2}$ if both the static and dynamic criticalities are available and it is desired to weight them equally. If one of the static and dynamic criticalities is not available, then a is set as 1 or 0, accordingly. The value of a can also be set in a way that represents confidence in the different criticalities, static versus dynamic.

In a similar manner, the VEP may be defined as a convex combination of: an exploitability score (ES) (e.g., obtained from the National Vulnerability Database or another suitable knowledge store); an exploit code maturity (ECM); and threat activity (TA) related to the vulnerability (when present). The values for ES, ECM and TA may be scaled to 10, or to some other desired scale. If TA is observed (e.g., via threat analysts), the following mapping may be used to map qualitative data in CVSS to quantitative values: no activity=0, low activity=3, medium activity=5, high activity=8, widespread=10. It should be appreciated, however, that various other scales and quantification may be used as desired, and that the mappings may be subject to change by certain users or authorized personnel. The vulnerability exploitability potential of a vulnerability v, denoted VEP(v), may be computed as $VEP(v)=\alpha \times ES(v)+\beta \times ECM(v)+\gamma \times TA(v)$, where $\alpha, \beta, \gamma \in [0,1]$, and $\alpha+\beta+\gamma=1$. It should be appreciated that the value of $\alpha$ used for computing VEP(v) may be different than the value of a used for computing AC(a) described above. If one of the components ES, ECM or TA are not available, the corresponding coefficient may be set to 0.

In some embodiments, it is assumed that there are a set of assets and for each asset there is an AC. For each vulnerability, it is further assumed that there is knowledge of the VIP and the VEP. Given a set of vulnerabilities $V=\{v_1, \ldots v_k\}$, for each $v_i$, let $VIP(v_i)$, $VEP(v_i)$ denote the VIP and VEP, respectively, of vulnerability $v_i$. Let the set of assets affected by V be $\{a_1, a_2, \ldots, a_n\}$. Also, for each vulnerability $v_i$, let $Sv_i$ be the set of assets that $v_i$ affects. For example, suppose vulnerability $v_1$ is present on assets $a_1$, $a_2$, and $a_3$, then $Sv_1=\{a_1, a_2, a_3\}$. The sets $Sv_i$ are assumed to be available from VRM assessment data.

Given the above, the weight function for vulnerabilities may be defined as:

$$w: Sv \times VIP(v) \times VEP(v) \rightarrow \mathbb{R},$$

$$w(v_i)=VIP(v_i) \times VEP(v_i) \times f(Sv_i), \text{ where } f(Sv_i)=\Sigma_{a \in Sv_iAC}(a)$$

$$w(v_i)=VIP(v_i) \times VEP(v_i) \times \Sigma_{a \in Sv_iAC}(a). \qquad \text{Eqn. (1)}$$

The vulnerability weight function is intuitive in that it is meant to capture the risk that a given vulnerability imposes on the enterprise system. Note that the weight of a vulnerability increases as: the number of assets a vulnerability affects increases; the criticalities of the assets it affects increases; the exploitability potential of a vulnerability increases; and the impact potential of the vulnerability increases. In some embodiments, it is desired to minimize the risk, and thus risk prioritization functions may order vulnerabilities based on their associated weight.

Figure 4:
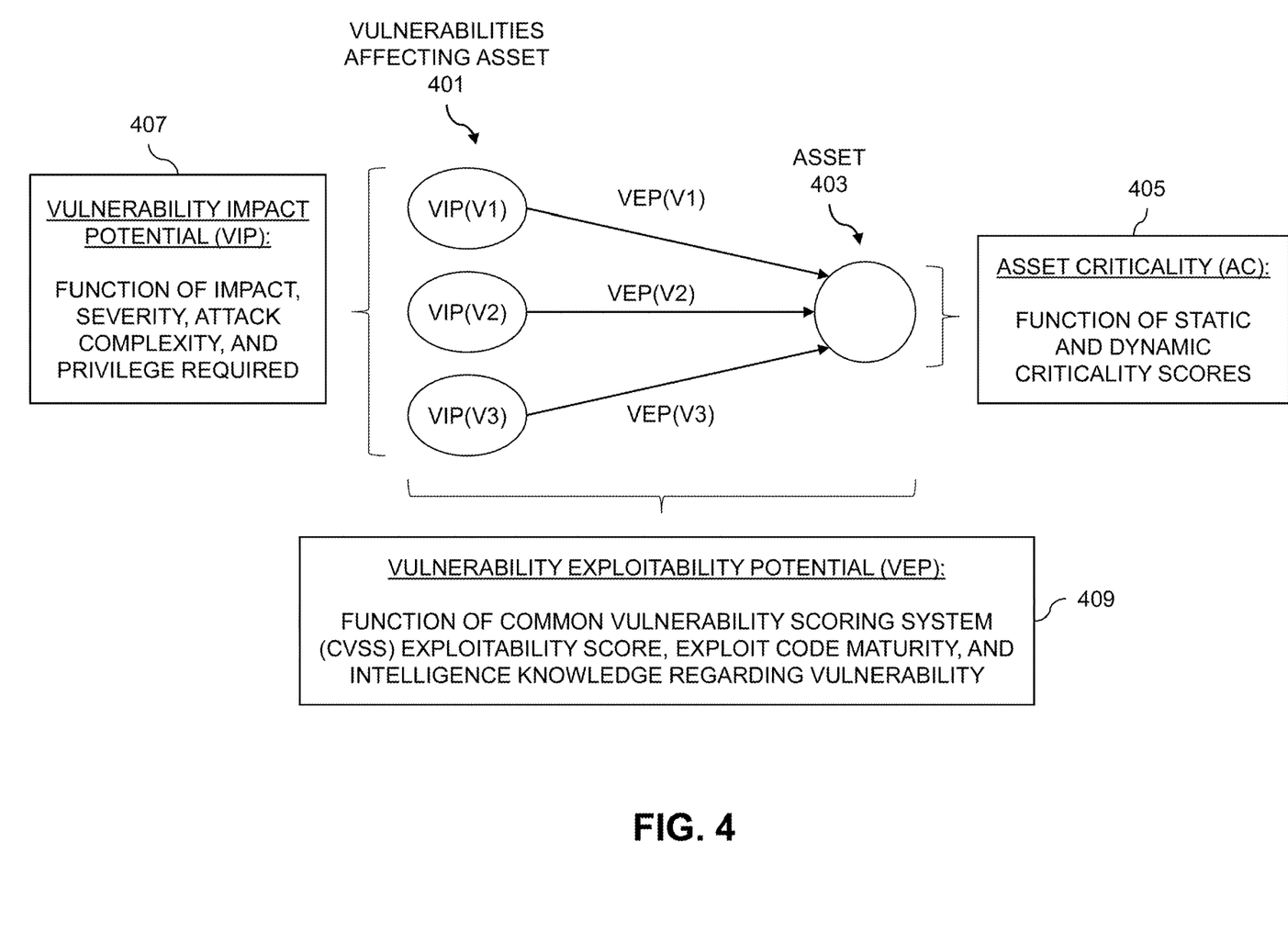
FIG. 4 illustrates relationships between vulnerability impact potentials and vulnerability exploitability potentials for multiple vulnerabilities on an asset of an enterprise system in an illustrative embodiment.

An asset weight function may also be defined, in a fashion similar to that described above for the vulnerability weight function. The asset weight function may utilize a multitude of available factors. The relationships and factors of the asset weight function are illustrated in FIG. 4. FIG. 4 shows a set of vulnerabilities 401 affecting an asset 403, with associated AC 405, VIP 407 and VEP 409 similar to AC 305, VIP 307 and VEP 309, respectively.

Given an asset a with criticality AC(a) that is impacted by a set of vulnerabilities $\{v_1, v_2, \ldots, v_k\}$, for each $v_i$, as before, let $VIP(v_i)$ and $VEP(v_i)$ be the VIP and VEP, respectively, of the vulnerability $v_i$. Given this information, the asset weight risk function is defined as:

$$w(a, v_i, \ldots, v_k) = AC(a) \times \Sigma_{i=1}^{k} VIP(v_i) \times VEP(v_i) \qquad \text{Eqn. (2)}$$

The asset weight risk function is intuitive in that it captures the risk that an asset and the set of vulnerabilities that affect the asset impose on the enterprise system. The weight of an asset increases as: the criticality of the asset increases; the number of vulnerabilities the asset is affected by increases; and the VIP and VEP of each of the vulnerabilities affecting the asset increase.

An algorithm for computing a vulnerability patching schedule, also referred to as Algorithm (A) for determining a partial order in which patches for different vulnerabilities should be applied, will now be described. The vulnerability patching schedule is a partial order on all vulnerabilities that have patches available, and hence an associated remediation action is to install a fix or patch that prevents the vulnerability from being exploited.

Algorithm (A) includes:
1. Let the set of vulnerabilities that have patches available be $V = \{v_1, \ldots v_k\}$.
2. Let the assets affected by V be $A = \{a_1, a_2, \ldots, a_n\}$.
3. Compute the weights of all vulnerabilities using Eqn. (1).
4. If only N vulnerabilities can be patched (e.g., due to time constraints, available computing resources, other demands, etc.), where N is the limit of how many vulnerabilities may be patched, remediated or otherwise handled at a given time, then:
   a. Order vulnerabilities according to their weight in non-increasing order.
   b. If two or more vulnerabilities have the same weight, then resolve ties based on one or more designated parameters such as knowledge of the operating systems used on the majority of the assets affected by a given vulnerability. For example, it may be desirable to patch or remediate assets with the Windows operating system before Red Hat Enterprise Linux, before Solaris, etc. The ranking of operating systems may be done based on market share, may be user-defined, etc.

An algorithm for computing an order in which assets should be patched, also referred to as Algorithm (B) for determining a partial order in which assets should be patched, will now be described. Algorithm (B) may be used to compute the order in which a set of assets of interest should be patched.

Algorithm (B) includes:
1. Let the set of assets of interest be $A = \{a_1, a_2, \ldots, a_n\}$.
2. For each asset $a_i \in A$, compute weights $w(a_i)$ using Eqn. (2).
3. Order the assets according to their weight in non-increasing order, where the weights are computed with vulnerabilities for which patches are available. If two or more assets have the same weight, then resolve ties based on one or more designated parameters such as knowledge of the operating systems used by the assets.

An algorithm for computing an order in which networks and sub-networks should be patched, also referred to as Algorithm (C) for determining a partial order in which networks and sub-networks should be patched, will now be described. Using information about the assets of an enterprise system, the vulnerabilities affecting such assets, and VRM assessment data, the Algorithm (C) ranks networks and sub-networks and outputs an order in which the networks and sub-networks should be patched, in highest-risk order first.

Algorithm (C) includes:
1. For each network or sub-network of an enterprise system, identify the set of assets in it (e.g., using IP addresses or subnet information). For a given network N, let the assets that belong to it be denoted as N(A). For example, $N(A) = \{a_1, a_2, \ldots, a_n\}$ is the set of assets in a given network (or a given sub-network or tier of a network) of an enterprise system. The weight of the network or sub-network is defined as the combined weight of the assets in it:

$$w(N) = \Sigma_{a \in N(A)} w(a),$$

where the weight of each asset is computed using Eqn. (2).
2. The patching order for the networks or sub-networks in the enterprise system is the non-increasing weight w(N) order of the networks or sub-networks. If two or more networks or sub-networks have the same weight, then ties may be resolved using on one or more designated parameters such as geographic location, number of active users, a designated preference based on knowledge of the operating systems used by the assets, etc.

An algorithm for selecting important assets for which remediation is necessary when patches are not available, also referred to as Algorithm (D) for determining a set of assets for which remediation is desired or necessary when patches are not available, will now be described. Suppose there are vulnerabilities for which patches are not currently available, and further suppose that such vulnerabilities have high impact and exploitation values. Also suppose that the enterprise system is able to apply security hardening procedures (e.g., increasing authentication requirements, creating protected and restricted networks such as by putting assets behind a firewall, etc.) to increase the security of assets impacted by such vulnerabilities (e.g., "un-patchable" assets). Such assets are referred to herein as "relocatable" assets. Let Va be the set of vulnerabilities for which patches are available, and let Vn be the set of vulnerabilities for which patches are not available. Let K be the number of assets an administrator can "relocate."

Algorithm (D) includes:
1. Run Algorithm (A) using Va as vulnerabilities and A as all assets of interest (e.g., in a particular sub-network or network, enterprise-level, etc.), such that $A = \{a_1, a_2, \ldots, a_n\}$.
2. It is possible, after step 1, that not all vulnerabilities in Va are patched, due to some constraints (e.g., time, availability of computing resources, etc.). Let Va' be the set of vulnerabilities that belong to Va but which remain unpatched after step 1.
3. Let $V = Va' \cup Vn$.
4. Run Algorithm (B) to order assets according to their weight induced by the set of vulnerabilities V.
5. Take the top K vulnerabilities in the order computed in step 4, and apply remediation actions. For vulnerabilities in the top K that are in Va', the remediation action may be applying the available patch. For vulnerabilities in the top K that are in Vn, the remediation action may be initiation "relocation" of affected assets.

The above-described techniques for prioritizing vulnerabilities may be extended in various ways. For example, the VIP and VEP functions can be extended through the use of additional or different factors and parameters than the specific examples given above, and by computing the convex combination of such appropriately. Similar to the VIP and VEP functions, various factors and parameters can be used in addition to or in place of the static and dynamic criticalities discussed above for computing AC. Further, the asset criticality function can be extended in various ways if desired by either extending the convex combination appropriately, or redefining the function.

The vulnerability weight function, as described above, is a product of its components as the risk of a vulnerability is present when: the vulnerability is critical; exploitability is high; and the vulnerability impacts some number of assets. If any of such components are 0, then so is the overall risk to the enterprise system. In some embodiments, however, it may be desirable to augment the vulnerability weight function through additional scaling and mathematics, such that the overall risk is not necessarily 0 if any one of such components is 0.

The vulnerability weight function and the asset weight function can each be modified as desired. For example, one or both of the vulnerability weight function and the asset weight function may be modified so as to consider a weight for each of its respective components, so that the weight of each component can be modified. In addition, the weight of a network or sub-network may be defined as a weighted sum of the weights of the assets belonging to that network or sub-network, so as to allow for human influence on the prioritization of networks and sub-networks.

In some embodiments, information regarding the stability of a patch that addresses one or more vulnerabilities may be used for prioritization. Vulnerabilities may be grouped based on the maturity of patches available for remediating the vulnerabilities, once such information is made available. A particular subset of vulnerabilities whose patches have a desired maturity level may be selected, followed by invoking one or more of the Algorithms (A)-(D) to produce a prioritization order of the selected subset of vulnerabilities having the desired maturity level, an order in which assets affected by the selected subset of vulnerabilities having the desired maturity level should be patched, etc.

Illustrative embodiments provide techniques for determining the order in which patches should be installed, the order in which assets should be patched, the order in which networks and sub-networks of an enterprise system should be prioritized, and sets of assets for which additional remediation actions should be taken when patches are not available. Using the techniques described herein, enterprise systems are able to enforce digital risk management that takes into account vulnerabilities and aspects related to their exploitability and severity. VRM assessment data is used along with criticalities of assets in the enterprise systems. Advantageously, embodiments are able to improve the security of enterprise systems.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for prioritizing remediation actions for addressing vulnerabilities in an enterprise system will now be described in greater detail with reference to FIGS. 5 and 6. Although described in the context of system 100, these platforms may also be used to implement at least portions of other information processing systems in other embodiments.

Figure 5:
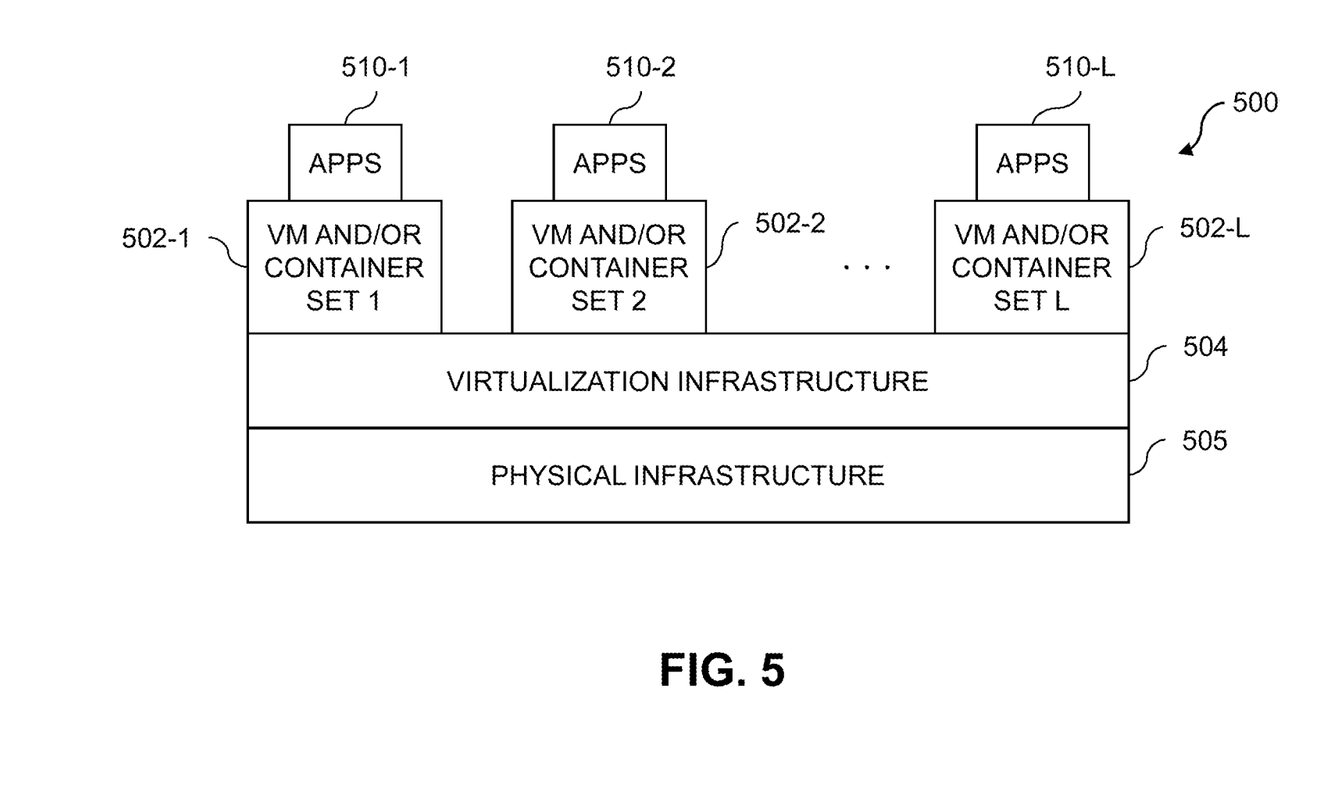
FIGS. 5 and 6 show examples of processing platforms that may be utilized to implement at least a portion of an information processing system in illustrative embodiments.
Figure 6:
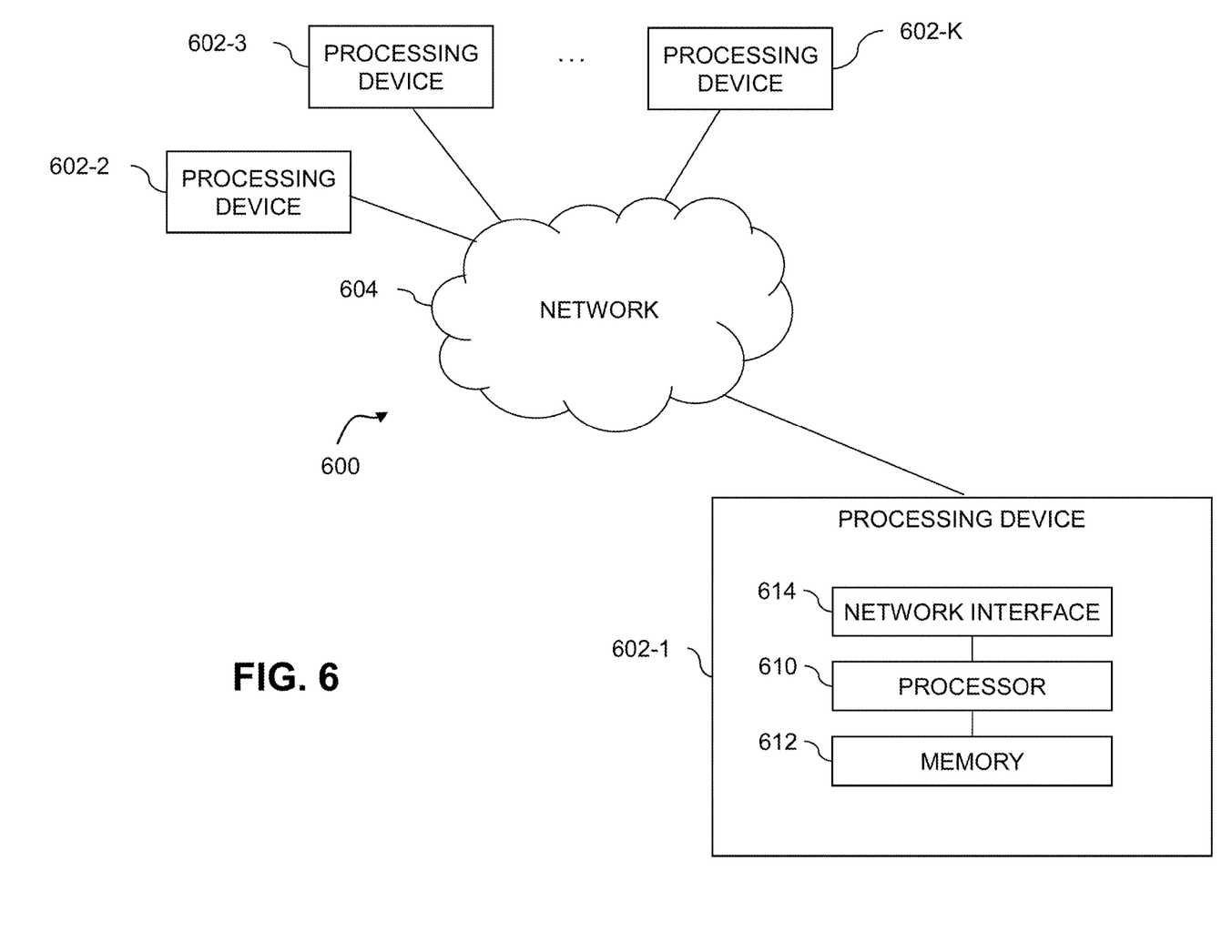

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. An example of a hypervisor platform that may be used to implement a hypervisor within the virtualization infrastructure 504 is the VMware® vSphere® which may have an associated virtual infrastructure management system such as the VMware® vCenter™. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for prioritizing remediation actions for addressing vulnerabilities in an enterprise system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, enterprise systems, assets, vulnerability impact and exploitability parameters, asset criticality parameters, vulnerability and asset weighting functions, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:
   identifying two or more vulnerabilities, each of the vulnerabilities affecting a set of one or more of a plurality of assets of an information technology infrastructure;
   assigning a weight to each of the vulnerabilities, the weight assigned to each of the vulnerabilities being based at least in part on the set of one or more assets affected by that vulnerability, asset criticalities associated with the set of one or more assets affected by that vulnerability, and at least one of (i) an exploitability potential of that vulnerability and (ii) an impact potential of that vulnerability;
   determining an order in which to apply a set of remediation actions in the information technology infrastructure to address at least one of the vulnerabilities based at least in part on the weights assigned to the vulnerabilities; and
   applying, in accordance with the determined order, at least one of the set of remediation actions to at least one of the plurality of assets in the information technology infrastructure;
   wherein determining the order in which to apply the set of remediation actions in the information technology infrastructure comprises:
      identifying two or more different network portions of the information technology infrastructure;
      identifying a subset of the plurality of assets located in each of the two or more different network portions of the information technology infrastructure;
      determining risk scores associated with respective ones of the two or more different network portions of the information technology infrastructure, wherein a given risk score for a given one of the two or more different network portions of the information technology infrastructure is based at least in part on (i) weights assigned to a given subset of the plurality of assets located in the given one of the two or more different network portions; and (ii) one or more designated parameters associated with the given one of the two or more different network portions; and
      selecting the order in which to apply the set of remediation actions in the information technology infrastructure based at least in part on an ordering of the two or more different network portions of the information technology infrastructure determined from the risk scores associated with respective ones of the two or more different network portions of the information technology infrastructure; and wherein the method is performed by at least one processing device comprising a processor coupled to a memory.

2. The method of claim 1 wherein the exploitability potential of a given vulnerability is based at least in part on an exploitability metric, an exploit code maturity metric, and a threat activity metric.

3. The method of claim 1 wherein the impact potential of a given vulnerability is based at least in part on an impact metric, a severity metric, an attack complexity metric, and a privilege required metric.

4. The method of claim 1 wherein assigning a given weight to a given one of the vulnerabilities comprise utilizing a vulnerability weight function that increases the given weight assigned to the given vulnerability:
   as a number of assets affected by the given vulnerability increases;
   as criticalities of the assets affected by the given vulnerability increases;
   as the exploitability potential of the given vulnerability increases; and
   as the impact potential of the given vulnerability increases.

5. The method of claim 1 further comprising assigning the weights to the plurality of assets of the information technology infrastructure based at least in part on static criticality metrics and dynamic criticality metrics associated with the plurality of assets.

6. The method of claim 5 wherein the static criticality metric for a given one of the plurality of assets is based at least in part on a type of one or more applications hosted on the given asset and an importance of the one or more applications to the information technology infrastructure.

7. The method of claim 5 wherein the dynamic criticality metric for a given one of the plurality of assets is based at least in part on usage of the given asset, a number of users that access the given asset, an amount of network traffic to and from the given asset, and a fraction of time that the given asset is in use in a designated time period.

8. The method of claim 1 wherein determining the order in which to apply the set of remediation actions in the information technology infrastructure further comprises selecting an ordering in which to apply one or more remediation actions to different ones of the plurality of assets in the given subset of the plurality of assets located in the given one of the two or more different network portion based at least in part on the weights assigned to the different ones of the plurality of assets in the given subset of the plurality of assets.

9. The method of claim 1 wherein assigning a given weight to a given one of the plurality of assets comprises utilizing an asset weight function that increases the given weight assigned to the given asset:
   as a criticality of the given asset increases;
   as a number of vulnerabilities affecting the given asset increases;
   as the exploitability potential of the vulnerabilities affecting the given asset increases; and
   as the impact potential of the vulnerabilities affecting the given asset increases.

10. The method of claim 1 wherein determining the order in which to apply the set of remediation actions in the information technology infrastructure further comprises selecting a subset of the plurality of assets to apply one or more of the set of remediation actions to for addressing one or more of the vulnerabilities that do not have available patches based at least in part on the weights assigned to the plurality of assets of the information technology infrastructure.

11. The method of claim 10 wherein a given one of the set of remediation actions for remediating a given vulnerability for which a patch is not available comprises applying one or more security hardening measures to a given one of the plurality of assets affected by the given vulnerability, a given one of the security hardening measures comprising at least one of:
   adding additional authentication mechanisms for accessing the given asset; and
   placing the given asset behind a firewall in the information technology infrastructure.

12. The method of claim 1 wherein a given one of the set of remediation actions for remediating a given vulnerability for which a patch is available comprises applying the patch to a given one of the plurality of assets.

13. A computer program product comprising a non-transitory processor-readable storage medium having stored therein program code of one or more software programs, wherein the program code when executed by at least one processing device causes the at least one processing device:
   to identify two or more vulnerabilities, each of the vulnerabilities affecting a set of one or more of a plurality of assets of an information technology infrastructure;
   to assign a weight to each of the vulnerabilities, the weight assigned to each of the vulnerabilities being based at least in part on the set of one or more assets affected by that vulnerability, asset criticalities associated with the set of one or more assets affected by that vulnerability, and at least one of (i) an exploitability potential of that vulnerability and (ii) an impact potential of that vulnerability;
   to determine an order in which to apply a set of remediation actions in the information technology infrastructure to address at least one of the vulnerabilities based at least in part on the weights assigned to the vulnerabilities; and
   to apply, in accordance with the determined order, at least one of the set of remediation actions to at least one of the plurality of assets in the information technology infrastructure;
   wherein determining the order in which to apply the set of remediation actions in the information technology infrastructure comprises:
      identifying two or more different network portions of the information technology infrastructure;
      identifying a subset of the plurality of assets located in each of the two or more different network portions of the information technology infrastructure;
      determining risk scores associated with respective ones of the two or more different network portions of the information technology infrastructure, wherein a given risk score for a given one of the two or more different network portions of the information technology infrastructure is based at least in part on (i) weights assigned to a given subset of the plurality of assets located in the given one of the two or more different network portions; and (ii) one or more designated parameters associated with the given one of the two or more different network portions; and
      selecting the order in which to apply the set of remediation actions in the information technology infrastructure based at least in part on an ordering of the two or more different network portions of the information technology infrastructure determined from the risk scores associated with respective ones of the two or more different network portions of the information technology infrastructure.

14. The computer program product of claim 13 wherein the program code when executed further causes the at least one processing device to assign the weights to the plurality of assets of the information technology infrastructure based at least in part on static criticality metrics and dynamic criticality metrics associated with the plurality of assets.

15. The computer program product of claim 13 wherein determining the order in which to apply the set of remediation actions in the information technology infrastructure further comprises selecting an ordering in which to apply one or more remediation actions to different ones of the plurality of assets in the given subset of the plurality of assets located in the given one of the two or more different network portion based at least in part on the weights assigned to the different ones of the plurality of assets in the given subset of the plurality of assets.

16. An apparatus comprising:
at least one processing device comprising a processor coupled to a memory;
the at least one processing device being configured:
to identify two or more vulnerabilities, each of the vulnerabilities affecting a set of one or more of a plurality of assets of an information technology infrastructure;
to a weight to each of the vulnerabilities, the weight assigned to each of the vulnerabilities being based at least in part on the set of one or more assets affected by that vulnerability, asset criticalities associated with the set of one or more assets affected by that vulnerability, and at least one of (i) an exploitability potential of that vulnerability and (ii) an impact potential of that vulnerability;
to determine an order in which to apply a set of remediation actions in the information technology infrastructure to address at least one of the vulnerabilities based at least in part on the weights assigned to the vulnerabilities; and
to apply, in accordance with the determined order, at least one of the set of remediation actions to at least one of the plurality of assets in the information technology infrastructure;
wherein determining the order in which to apply the set of remediation actions in the information technology infrastructure comprises:
identifying two or more different network portions of the information technology infrastructure;
identifying a subset of the plurality of assets located in each of the two or more different network portions of the information technology infrastructure;
determining risk scores associated with respective ones of the two or more different network portions of the information technology infrastructure, wherein a given risk score for a given one of the two or more different network portions of the information technology infrastructure is based at least in part on (i) weights assigned to a given subset of the plurality of assets located in the given one of the two or more different network portions; and (ii) one or more designated parameters associated with the given one of the two or more different network portions; and
selecting the order in which to apply the set of remediation actions in the information technology infrastructure based at least in part on an ordering of the two or more different network portions of the information technology infrastructure determined from the risk scores associated with respective ones of the two or more different network portions of the information technology infrastructure.

17. The apparatus of claim 16 wherein the at least one processing device is further configured to assign the weights to the plurality of assets of the information technology infrastructure based at least in part on static criticality metrics and dynamic criticality metrics associated with the plurality of assets.

18. The apparatus of claim 16 wherein determining the order in which to apply the set of remediation actions in the information technology infrastructure further comprises selecting an ordering in which to apply one or more remediation actions to different ones of the plurality of assets in the given subset of the plurality of assets located in the given one of the two or more different network portion based at least in part on the weights assigned to the different ones of the plurality of assets in the given subset of the plurality of assets.

19. The apparatus of claim 16 wherein the one or more designated parameters comprise personnel responsible for managing the given sub set of the plurality of assets located in the given one of the two or more different network portions.

20. The apparatus of claim 16 wherein the one or more designated parameters comprise whether the given subset of the plurality of assets located in the given one of the two or more different network portions are part of a public network address space or a non-routable network address space.

* * * * *